UNITED STATES PATENT OFFICE.

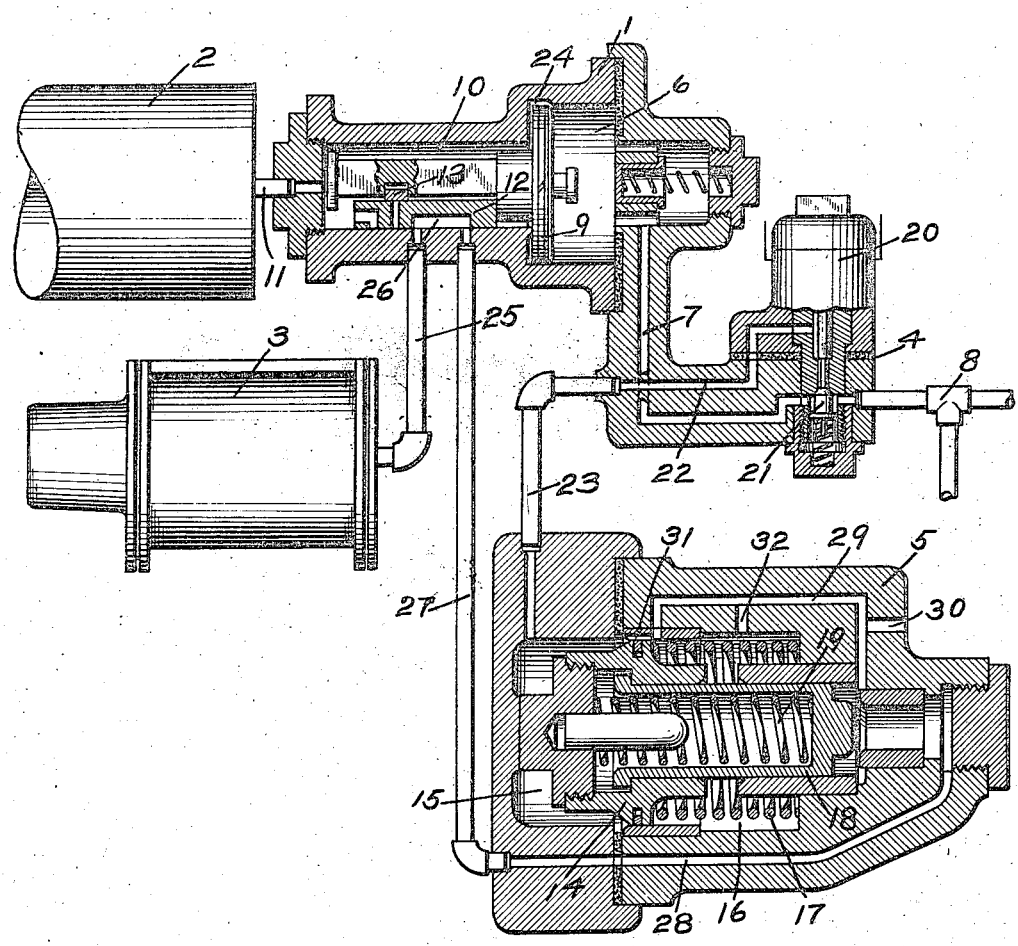

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,256,618.   Specification of Letters Patent.   Patented Feb. 19, 1918.

Application filed March 28, 1917. Serial No. 157,932.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly of that type adapted to be electrically controlled.

In certain types of electro-fluid pressure brakes, the brakes are applied by venting fluid from the brake pipe through the operation of an electro-magnet controlled valve.

It sometimes happens that the brakes are applied electrically when the brake valve is in a position for feeding fluid under pressure to the brake pipe, so that there is a possibility that the equalizing piston may be shifted to release position by the increase in brake pipe pressure, although the emergency magnet valve is open; for example, the above condition may occur when the well known dead man's control is employed, in which the emergency magnets are energized to effect a reduction in brake pipe pressure upon removal of the operator's hand from the controller handle.

The principal object of my invention is to provide means for preventing the release of the brakes so long as the magnet controlled vent valve remains open.

In order to accomplish the above object, a valve device is provided for closing the brake cylinder exhaust upon opening the magnet controlled valve.

In the accompanying drawing, the single figure is a sectional view of an electro-fluid pressure brake apparatus embodying my invention.

As shown in the drawing, the apparatus may comprise a brake controlling valve device such as a triple valve device 1, an auxiliary reservoir 2, a brake cylinder 3, a magnet valve device 4, and a brake cylinder exhaust controlling valve device 5.

The triple valve device 1 comprises the usual casing having a piston chamber 6 connected by passage 7 to brake pipe 8 and containing piston 9 and a valve chamber 10 connected by pipe 11 to auxiliary reservoir 2, and containing a main slide valve 12 and a graduating valve 13 mounted on the main valve and having a movement relative thereto.

The brake cylinder exhaust controlling valve device 5 may comprise a casing containing a piston 14 having a piston chamber 15 on one side and a chamber 16 on the opposite side containing a spring 17 adapted to resist the movement of said piston.

Slidably mounted within piston 14 is a cup shaped valve 18 for controlling the brake cylinder exhaust, and interposed between the piston 14 and the valve 18 is a spring 19.

The magnet valve device 4 may comprise a magnet 20 and a valve 21 adapted to be operated by said magnet for controlling communication from brake pipe passage 7 to a passage 22 and a pipe 23 leading to piston chamber 15.

In operation, fluid supplied to the brake pipe 8 flows to passage 7 and thence to piston chamber 6 of the triple valve device 1 and from the piston chamber 6 fluid flows through the usual feed groove 24 around the piston 9 to valve chamber 10 and auxiliary reservoir 2.

The triple valve parts being in release position, the brake cylinder 3 is connected through pipe 25, exhaust cavity 26, in slide valve 12 to pipe 27, leading to passage 28 in the brake cylinder exhaust controlling valve device 5.

Normally, the magnet valve 21 is held closed, and since there is no fluid pressure in piston chamber 15, the piston 14 is maintained in the position shown in the drawing by the spring 17, so that valve 18 is held open, permitting flow from passage 28, past the valve 18 to passage 29 and atmospheric exhaust port 30.

In this position, fluid is therefore free to escape from the brake cylinder 3 to the exhaust port 30.

If the magnet 20 is energized, the valve 21 is opened, so as to vent fluid from the brake pipe 8 to passage 22 and thence fluid flows through pipe 23 to piston chamber 15, operating piston 14 to first close the valve 18 and cut off the brake cylinder exhaust and then upon further movement relative to the valve 18 to open passage 29 to piston chamber 15, so that fluid is vented from said chamber and consequently from the brake pipe to exhaust port 30, to effect the desired reduction in brake pipe pressure. The closing of the brake cylinder exhaust before the brake pipe vent is opened is desired in order to prevent the possibility of the brake pipe vent opening and then failing to move so as to close the brake cylinder exhaust.

The piston 14 will hold the brake cylinder exhaust valve 18 closed so long as the magnet valve 21 remains open, and there is an appreciable flow of fluid from the brake pipe.

Upon deënergizing the magnet 20, the valve 21 is closed, and fluid pressures then quickly equalize on opposite sides of piston 14, so that the spring 17 operates to return the piston to normal position, opening the valve 18, and permitting the free exhaust of fluid from the brake cylinder.

In order to prevent possible leakage past the valve 21 in closed position from operating piston 14, a restricted groove 31 is provided, which is open in the normal position of the piston, to permit escape of any leakage fluid to exhaust port 30.

A passage 32 connects spring chamber 16 with passage 29, so as to prevent the possible formation of an air cushion in said chamber upon movement of the piston 14.

Having now described my invention, what I claim as new and desire to secure by Letters Patent, is:—

1. In an electro-pneumatic brake, the combination with a brake cylinder, of an electrically controlled valve for venting fluid to effect an application of the brakes and a valve device operated by fluid vented from said electrically controlled valve for controlling the exhaust from the brake cylinder.

2. In an electro-pneumatic brake, the combination with a brake cylinder, of an electrically controlled means for effecting an application of the brakes, a valve for controlling the brake cylinder exhaust, and a piston controlled by the operation of said electrically controlled means for operating said valve.

3. In an electro-pneumatic brake, the combination with a brake cylinder, of an electrically controlled valve for venting fluid to effect an application of the brakes, a valve for controlling the brake cylinder exhaust, and a piston operated by fluid vented from said electrically controlled valve for operating said brake cylinder exhaust valve.

4. In an electro-pneumatic brake, the combination with a brake cylinder, of an electrically controlled valve for venting fluid to effect an application of the brakes, a valve for controlling the brake cylinder exhaust, and a piston operated by fluid vented from said electrically controlled valve for operating said brake cylinder exhaust valve and for venting fluid from said electrically controlled valve to the atmosphere.

5. In an electro-pneumatic brake, the combination with a brake cylinder, of an electrically controlled valve for venting fluid to effect an application of the brakes, a valve for controlling the brake cylinder exhaust, and a piston operated by fluid vented from said electrically controlled valve for first closing said brake cylinder exhaust valve and for then opening communication for venting fluid from said electrically controlled valve to the atmosphere.

6. In an electro-pneumatic brake, the combination with a brake cylinder, of an electrically controlled valve for venting fluid to effect an application of the brakes, a valve for controlling the brake cylinder exhaust, and a piston operated by fluid vented from said electrically controlled valve for first closing said brake cylinder exhaust valve and having a further movement relative to the valve for opening communication from said electrically controlled valve to the atmosphere.

In testimony whereof I have hereunto set my hand.

WALTER V. TURNER.